(12) United States Patent
Stemer

(10) Patent No.: US 6,364,433 B1
(45) Date of Patent: Apr. 2, 2002

(54) AUTOMOTIVE BRAKE SYSTEM AND METHOD

(76) Inventor: Werner H. Stemer, 1008 SW. 5th Pl., Fort Lauderdale, FL (US) 33312

( * ) Notice: Subject to any disclaimer, the term of this patent is extended or adjusted under 35 U.S.C. 154(b) by 0 days.

(21) Appl. No.: 09/307,494

(22) Filed: May 7, 1999

(51) Int. Cl.7 .................................................. B60T 8/32
(52) U.S. Cl. ......................... 303/138; 303/125; 303/89; 180/275
(58) Field of Search .................................. 340/436, 437; 180/275; 303/138, 191, 89, 125

(56) References Cited

U.S. PATENT DOCUMENTS

| | | | | |
|---|---|---|---|---|
| 3,752,250 A | * | 8/1973 | Speer ............................ | 180/275 |
| 3,810,520 A | * | 5/1974 | Iwata et al. .................... | 180/275 |
| 3,986,577 A | * | 10/1976 | Ebbesson et al. ............. | 180/275 |
| 4,105,237 A | * | 8/1978 | Viall, Sr. et al. .............. | 180/275 |
| 4,207,958 A | * | 6/1980 | Viall, Sr. et al. .............. | 180/275 |
| 4,629,043 A | * | 12/1986 | Matsuo et al. ................ | 188/2 D |
| 4,641,871 A | * | 2/1987 | Vaughn ......................... | 180/275 |
| 4,925,252 A | * | 5/1990 | Hee ............................... | 303/89 |
| 5,230,543 A | * | 7/1993 | Douglas et al. ............... | 180/275 |
| 5,372,411 A | * | 12/1994 | Gerstenmaier et al. ....... | 303/191 |
| 6,105,705 A | * | 8/2000 | Faye .............................. | 180/275 |

* cited by examiner

Primary Examiner—Robert J. Oberleitner
Assistant Examiner—Robert A. Siconolfi
(74) Attorney, Agent, or Firm—Werner H. Stemer

(57) ABSTRACT

The safety brake system for a motor vehicle continuously monitors for a rear impact collision. If the rear impact is classified as one requiring responsive intervention, the system applies a braking force to the motor vehicle wheels. If the vehicle was stopped with the brake applied at the instant of the rear impact, then the brakes are completely blocked. As a result, the brakes are not released when the driver's foot is forced off the brake pedal upon impact and the resultant forward jerk of the vehicle is reduced or substantially suppressed. If the car was traveling a given speed at the instant of impact, the brakes are applied with a reduced braking force.

10 Claims, 2 Drawing Sheets

AUTOMOTIVE BRAKE SYSTEM AND METHOD

BACKGROUND OF THE INVENTION

FIELD OF THE INVENTION

The invention lies in the automotive field. Specifically, the invention relates to a brake system for a motor vehicle with rear end collision impact mitigation.

DESCRIPTION OF THE RELATED ART

Motor vehicles such as automobiles have a brake system which, upon actuation, brakes all wheels. Such brake systems are hydraulic pump systems in most modem vehicles. When a brake pedal is actuated by the driver, an actuator shaft translates the brake pedal pressure onto a piston/cylinder arrangement and the pressure in the cylinder is increased. The cylinder is generally referred to as the master cylinder. The master cylinder is bound into a closed loop hydraulic pressure system with a separate brake cylinder assigned to each wheel. The force (pressure) at the master cylinder causes a displacement at the individual wheel brake cylinders and the brake pedal force, i.e. its displacement, is translated to a brake pad or caliper displacement at the wheel. The hydraulic fluid is substantially incompressible.

These most widely prevalent brake systems have recently been replaced or augmented by electrical systems, so-called brake-by-wire systems. In the electrical brake system, the brake pedal force is not mechanically transmitted to the wheel brakes by way of the hydraulic fluid. Instead, the pedal displacement and force is measured and electronically processed. Individual electric actuators are thereupon triggered at the individual wheels so as to brake the wheels.

The electrical brake system is particularly suitable in the context of wheel slip regulators, such as anti-lock brake systems. In the hydraulic brake system, of course, the anti-lock brake system is quite complicated and expensive in that a full set of additional actuators must be provided so as to override or compensate against the force of the hydraulic wheel cylinder at each wheel. Furthermore, the purely mechanical hydraulic system does not in and of itself provide any measured force values which could be used in the processing of the anti-lock action of the additional inline actuators. In contrast, in the brake-by-wire system, the anti-lock actuation process can be fully integrated in the electronic processing and electrical triggering of the wheel brakes.

A well-developed anti-lock brake system is described, for instance, in U.S. Pat. No. 5,312,170 to Erban et al. and the various references described in the patent. As in all related ABS systems, the anti-lock process is described in two phases, namely the brake regulation phase in which the brake is actuated until a setpoint slip value is reached and a brake pressure control if the pertinent wheel is unstable in operation.

A method and a corresponding configuration for determining a frictional value between the tire and the road surface is described in U.S. Pat. No. 5,513,907 to Kiencke et al. There, the speed of the vehicle, the brake pressure at each wheel, and the angular acceleration of the wheel are introduced into the calculation which determines the actual coefficient of friction between the tire and the road.

Despite the substantial advances in automotive technology in regards to brake systems, impact reduction measures (bending body cages, forced restraint systems, air bags, etc.), and early impact warning sensors, the automobile is still less than acceptably safe. One specific source of personal injury and property damage are rear impact collisions. The primary damage done by rear impact collisions is the body damage to the rear of the forward vehicle and to the front end of the rear vehicle. Slight impact collisions are damped and fully compensated by front and rear shock-absorbing bumpers.

Stronger impact forces caused by collisions at relative speeds of, say, more than 20 kmh ($\approx$12 mph) also have a tendency to injure the persons in the vehicles. Due to the substantial advances in driver and passenger restraint systems (for instance tightening seat belts, airbags), which largely concentrate on front and side impact, the persons in the rear vehicle are, or should be, well protected. The persons in the forward vehicle, on the other hand, are very suddenly jolted backwards (in fact, of course, the car accelerates forward very quickly and the persons and other relatively loose objects observe Newton's first law instead of lunging forward together with the forward vehicle) upon the impact. The most prevalent injury which results from such rear impact collisions is known as whiplash. Bodily injury, of course, is typically rated with a higher priority than mechanical damage to the vehicle body. In monetary terms, medical bills for full treatment of whiplash injuries are very often substantially higher than the repair costs for body damage done to the vehicles.

In addition to the damage done to the two vehicles that are directly involved, it often happens that the forward vehicle is propelled forward by the impact force and thereby collides with yet another vehicle. Domino-effect chain reactions with multiple injuries are quite possible even at relatively small rear impact speed.

The resulting whiplash, and the possible involvement of further vehicles, could be substantially reduced, were it not for a little observed phenomenon. Most rear end collisions occur when the forward vehicle is either at a standstill or is being decelerated. In either case, the driver's foot applies a braking force by pushing the brake pedal forward. When the impact from the rear end collision accelerates the vehicle forward, the driver's foot is lifted from the brake pedal (again, this is Newton's first law) and the brakes are released. As a result, the resistance of the forward vehicle against the sudden acceleration is reduced to a minimum. As will be seen from the following calculations, the continued, or even increased, application of the vehicle brakes can indeed have a substantial mitigating effect on the resulting damage.

SUMMARY OF THE INVENTION

It is accordingly an object of the invention to provide a motor vehicle brake system with rear impact mitigation, which overcomes the above-mentioned disadvantages of the prior art devices and methods of this general type and which with the foregoing and other objects in view there is provided, in accordance with the invention, a brake system for a motor vehicle with a front end, a rear end, and a plurality of wheels, comprising:

a sensor disposed in a motor vehicle for sensing a rear impact collision and outputting an impact signal;
  a brake processor connected to the sensor to receive the impact signal from the sensor indicating a rear impact collision;
  the brake processor applying a braking force to at least one wheel of the motor vehicle upon determining that a rear impact collision has occurred.

In accordance with an added feature of the invention, the sensor, or one of a plurality of sensors, is an acceleration sensor. In a preferred embodiment, the acceleration sensor has four sensitivity axes for sensing forward acceleration, rearward acceleration, and two mutually opposite lateral accelerations, respectively.

In a most inexpensive implementation of the brake system of the invention, the system makes used of the acceleration sensor that already forms a part of the passenger protection system of the motor vehicle. The standard passenger protection system includes sensors, processors, and trigger algorithms for air bags and for belt tensioners (as well as the ABS or traction control implementation for the brake system). In that case, only the triggering program of the protection system must be adapted to trigger a braking force on a corresponding rear impact.

In accordance with an additional feature of the invention, the above-noted sensor is included in a plurality of sensors that are strategically disposed throughout the motor vehicle, including at positions at the rear end of the motor vehicle.

In accordance with another feature of the invention, the processor is programmed to:
  continuously monitor a travel speed of the vehicle and measure a braking force being applied during an operation of the vehicle;
  define a class of impacts requiring a brake intervention in dependence on the travel speed and on whether the vehicle brake was applied at an outset of the rear impact collision;
  block the brakes with a maximum braking force if the vehicle was at a standstill and the vehicle brake was applied at an outset of the rear impact collision; and
  apply a braking force equivalent to the braking force last measured prior to a rear impact immediately upon an outset of the rear impact collision.

With the above and other objects in view there is also provided, in accordance with the invention, a passenger protection method in a motor vehicle. The method comprises the following steps:
  sensing a sudden impact at a rear end of a motor vehicle and outputting an impact signal representing a rear impact collision;
  receiving and processing the impact signal to determine whether the rear impact is one of a class of impacts requiring brake intervention; and
  if the rear impact belongs to the class of impacts requiring brake intervention, applying a braking force to at least one wheel of the motor vehicle.

In accordance with a preferred mode of the invention, the travel speed of the vehicle is constantly monitored and recorded and the system also monitors constantly whether the vehicle brakes are being applied. The class of impacts requiring brake intervention are then defined in dependence on the travel speed and on whether the vehicle brake was applied at an outset of the rear impact collision.

In accordance with a further feature of the invention, if the vehicle was at a standstill and a vehicle brake was applied at an outset of the rear impact collision, the applying step comprises blocking the brakes with a maximum braking force.

In accordance with a concomitant feature of the invention, the travel speed of the vehicle is continuously monitored and the braking force being applied during an operation of the vehicle is continuously measured. The above-noted applying step then comprises applying the braking force last measured prior to a rear impact immediately upon an outset of the rear impact collision.

Other features which are considered as characteristic for the invention are set forth in the appended claims.

Although the invention is illustrated and described herein as embodied is in a motor vehicle brake system and method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
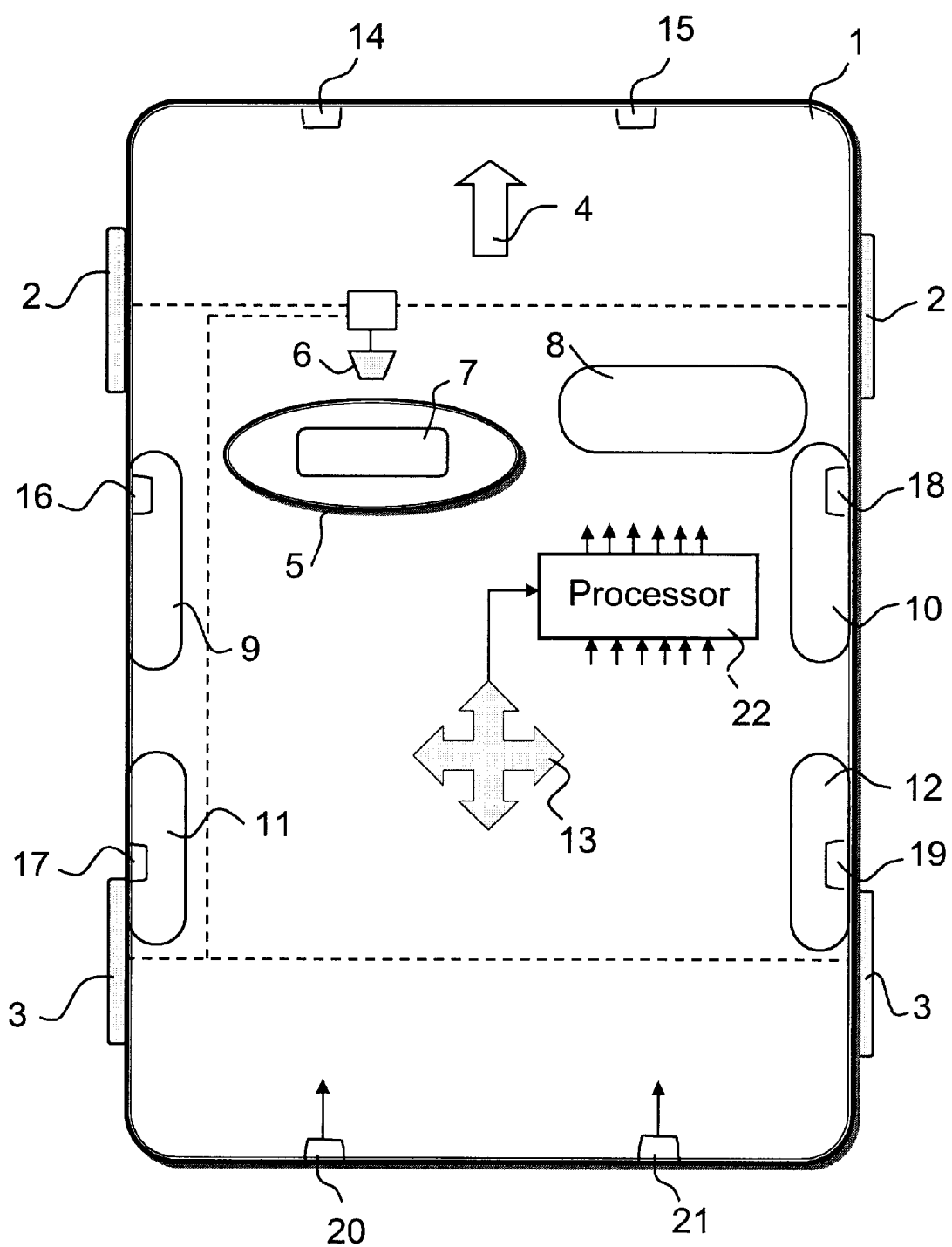
FIG. 1 is a diagrammatic plan view of an automobile.

Referring now to the figures of the drawing in detail and first, particularly, to FIG. 1 thereof, there is seen a motor vehicle 1 with two front wheels 2 and two rear wheels 3. The motor vehicle 1 travels in a forward travel direction 4 and it is steered with a steering wheel 5. The wheels 2 and 3 are braked by the actuation of a brake pedal 6.

The brake system of the vehicle 1 may be a hydraulic brake system, an electrical brake-by-wire system, or a hybrid of the two. In the hydraulic system, the brake pedal 6 acts on a master cylinder, which communicates hydraulically with individual brake cylinders at the brake caliper of each of the wheels 2 and 3. In the electrical system, the brake pedal position and the desired braking force are sensed at the brake pedal, converted into corresponding signals in a brake system processor, and then electrically communicated to the brake actuators at each wheel. These types of systems are sufficiently known to those of skill in the automotive art and they will, therefore, not be described in more detail.

The vehicle 1 is equipped with a passenger protection system which includes several air bags. The air bags illustrated in the exemplary drawing FIG. 1 include a driver's side air bag 7 and a passenger side air bag 8. Additionally, a left side impact air bag 9 is disposed at the driver's door, a right-side impact air bag 10 is disposed at the passenger door, and the rear doors are provided with side impact air bags 11 and 12 as well.

The air bags 7–12 are triggered in the case of a frontal collision or on side impact. These collisions are commonly sensed by an acceleration sensor 13 and any of the crunch zone sensors 14–19. The acceleration sensor 13 of the preferred embodiment is a seismic sensor with four sensitivity axes that correspond to the forward acceleration vector, the rearward acceleration vector (also referred to as the forward deceleration), and the two lateral acceleration vectors. Sensors of this type are known in the art. One such sensor is described, for example, in published German patent application DE 44 11 130 A1 (Siemens Corporation). A sensor assembly complete with sensor, sensing element memory, processor, and decoder, is described in published European patent application EP 0 567 938 A1 (Texas Instruments). A useful processor system in which the characteristics of an acceleration sensor may be diagnosed is described in Japanese application JP 04-125897 (published German application DE 43 16 263 A1)(Hitachi Automotive Engineering). The crunch zone sensors 14–19 are typically open electrical switches that close the circuit to which they are connected upon being deformed.

In the preferred embodiment, the vehicle 1 is also equipped with two or more rear impact crunch zone sensors 20, 21. In a most simple embodiment of the invention, the sensors 20, 21 may be simple contact switches that are closed when the rear bumper of the vehicle is displaced into its impact absorbers by more than a defined threshold distance. Depending on the rigidity of the impact absorber spring or shock absorber, the displacement threshold may be defined to correspond to an impact of, say, 10 km/h ($\approx$6 mph). The sensors 20, 21 are preferably reusable, i.e. they continue to be operational after having been triggered.

A processor 22 is connected to each of the various sensors 13 and 14–21 and receives corresponding signals. Details of the connections, signal generation, and signal processing will not be described herein for reasons of brevity. Those of skill in the art will understand with reference to prior art protection systems in conjunction with the following functional description how the various signals should be processed and protection measures should be implemented. Also, all of the air bags, belt tensioners, and similar passenger protection systems are to be triggered and fired in accordance with any of the conventional is prior art systems.

Rear side impact can be detected in one of two ways, namely by the acceleration sensor 13 or the impact sensors 20, 21. In order to omit spurious signal outputs, the two readings may be combined so as to assure that both sensors (13+20 and/or 13+21) are indeed triggered. If the motor vehicle is at a standstill or it is traveling at a very slow speed (e.g. v<8 km/h), the brakes should be applied upon the detection of a rear impact that exceeds a given force.

Figure 2:
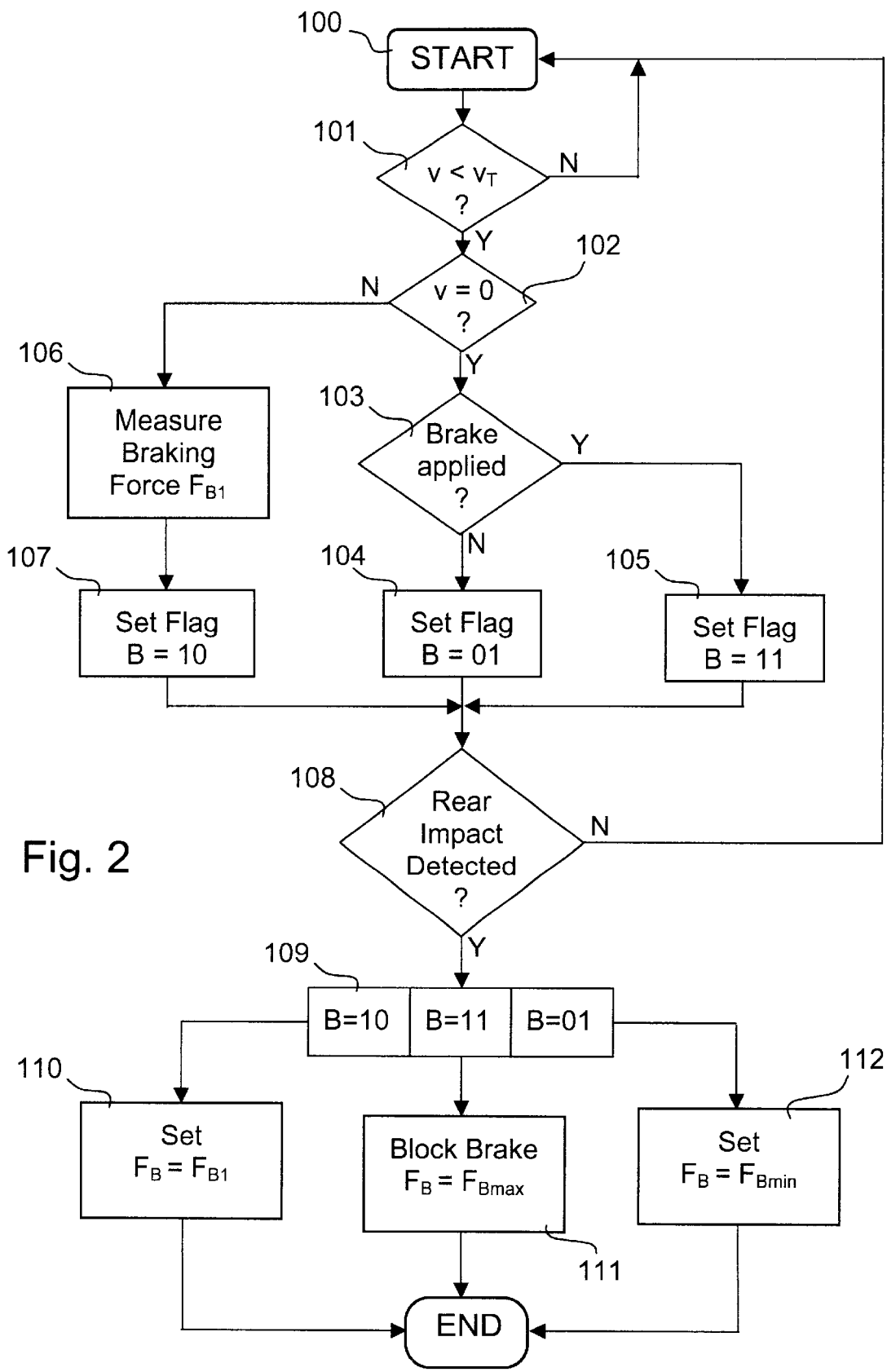
FIG. 2 is a flowchart illustrating a method of controlling a brake system according to the invention.

Referring now to the flowchart of FIG. 2, the processor starts at step 100 and first loops through a query 101 whether the actual traveling speed v of the vehicle lies below a predetermined threshold speed $v_T$. Unless the vehicle travels at a speed less than $V_T$, the brake control according to the invention is not triggered. The actual speed v is available in the engine control unit for several other processing operations and is therefore easily obtained. The threshold speed $v_T$ may be set to include only forward travel and standstill ($0 \leq v_T$) or it may include reverse travel speed of up to a few km/h. In that regard, the novel system includes—essentially a beneficial auxiliary effect—a rearward travel impact mitigation system. The threshold speed $v_T$, in a most simple program, may be set as a fixed value below which the novel program should become active. For instance, the system may be triggered when the vehicle slows to a speed of approximately 20 km/h ($\approx$12.5 mph). The threshold speed $v_T$ may also be dynamically set during a deceleration of the vehicle. If the program determines in the query step 101 that the actual speed is below the threshold speed ($v<v_T$ is TRUE), the program steps to a further query 102.

In a first branch query 102 the program determines whether the vehicle is at a standstill v=0. It the condition is met, the program proceeds to a further branch query 103. In the query step 103, the processing program ascertains whether the brake pedal 6 is engaged. If the condition is met, a flag is set for further processing. The flag B=01 thus states that the vehicle is at a standstill and the driver is stepping on the brake pedal 6. It is also possible to store the actual braking force $F_B$ currently applied with the flag B=01. If the condition is not met, the flag is set to B=11, which means that the vehicle is at a standstill and the foot brake is not applied.

If the vehicle is not at a standstill (v$\neq$0 or v>0), then the braking force is measured at step 106. In a brake-by-wire system, that information is readily available because it belongs to one of the essential parameters. In most hydraulic systems, the variable $F_B$ is already measured as well, specifically for ABS and traction control applications. If the signal is not readily available, it is easily ascertained by including a hydraulic pressure sensor inline from the master cylinder to, for example, one of the forward wheel brake cylinders. In the same branch the flag B is set to 10, which means that the vehicle is not at a standstill and that the braking force $F_B$ has been measured and is available as the parameter $F_{B1}$ for further processing.

Next, the sensor signals of the sensors 13, 20 and 21 are processed to determine whether the vehicle is subject to a rear impact collision. The processing algorithm regarding the rear impact is equivalent to that of the front impact or side impact collision and will, therefore, not be described in detail herein. In the simplest embodiment, either one of the crunch sensors may trigger the brake system of the invention, or it may be triggered if the rearward sensitivity axis of the sensor 13 exceeds a given acceleration threshold. The two measurements may also be appropriately combined so as to prevent triggering the system on a spurious signal.

It is possible to apply the brakes more strongly to one side of the vehicle. This is advantageous in the following scenario: Assuming the impact occurs on the left-hand side and triggers the sensor 20, without triggering the sensor 21. If, in addition, the sensor 13 indicates a deflection along the back vector and one of the lateral vectors, the program easily ascertains that the collision is on the side. In response, the system brakes only the left-hand wheels (or brakes the left-hand wheels more strongly than the right-hand wheels). As a result, the system blocks not only against a forward jerk, but against a spin of the car in the clockwise direction. An additional benefit is that the system reduces the resulting twisting stress on the body of the car which could bend the body out of alignment.

In any case, as long as the query step 108 returns a negative result, the program loops back to repeat, starting from the query 101, all preliminary measurement steps. When the query step 108 returns a no positive result, the blocking brake system is triggered in accordance with the content of the flag B in the fork 109 (subroutines IF. . . THEN):

If B=10, the braking force is set to $F_{B1}$ in step 110. $F_{B1}$ is the braking force measured just prior to the rear impact. The result is that, even though the driver's foot is lifted from the brake pedal due to the impact, the brake is not released and the driver's involuntary release of the brake is overruled by the system. In a refinement, the braking force $F_{B1}$ may be set as the starting value and then slowly increased to $F_{Bmax}$ until the vehicle is stopped.

If B=11, the braking force is set to the maximum $F_{Bmax}$ at the step 111. In other words, the driver's intent (car standing still and brake applied means that the driver intended to maintain the standstill for the time being) to keep the car stopped is continued by blocking the brake and thus providing a maximum in resistance to the rear impact. Accordingly, if the driver's foot is forced off the brake pedal due to the forward jerk of the vehicle, the brake engagement is maintained in spite of the release of the brake, because the action is involuntary.

If B=01, the braking force is set to the minimum $F_{Bmin}$ at the step 112. The minimum is defined as the least necessary response to the rear impact. For instance, if the acceleration signal of the sensor 13 indicates an impact of minor magnitude just above the trigger threshold, then the braking force is set to the minimum that corresponds to that trigger threshold. For instance, if the threshold is set to an impulse of, say, $\vec{p}=280$ Ns (≈corresponds to a central impact of m=1000 kg at a velocity of v=10 km/h for a time t=1/10 s), then the minimum braking force $F_{Bmin}$ is set to about $1.8 \cdot 10^3$ N for a vehicle with a mass of about m=1000 kg.

Any collision in a real setting is neither completely elastic nor completely inelastic. However, the invention can be understood from a review of the two extremes and by then considering a middle ground. The slower the relative speed between two colliding objects, the more elastic the collision will be. The faster the speed, the more inelastic the collision will be and thus the objects will be more deformed. This is expressed by the coefficient of restitution, which is a ratio expressing the relative speed of two objects after the collision to the relative speed before the collision. Thus, $$e = \frac{v_2 - v_1}{u_1 - u_2},$$

where, in the context of a motor vehicle rear impact collision, v is the speed of the forward vehicle and u is the speed of the rear vehicle. The subscript 1 refers to the pre-collision speeds and the subscript 2 refers to the post-collision speeds. For a completely elastic collision the coefficient e=1, for a completely inelastic collision the coefficient e=0. In the low speed range that is of is interest in this invention, the coefficient will be in the range 0.5<e<1.

In momentum terms, a completely elastic, central and straight collision is expressed as $m_1v_1+m_2u_1=m_1v_2+m_2u_2$, where $v_1$ and $v_2$ are the pre-collision and post-collision speeds, respectively, and $m_1$ is the mass of the first vehicle, respectively, and $u_1$ and $U_2$ are the pre-collision and post-collision speeds, respectively, and $m_2$ is the mass of the second vehicle. If the masses are equal m1=m2, then the masses cancel out and the velocity of the impacting vehicle is completely transferred to the "receiving" vehicle. In energy terms, $m_1(v_1^2-v_2^2)=m_2(u_2^2-u_1^2)$, the entire energy is transferred during the impact of cars of equal mass.

Assuming that a complete transfer has occurred in a fully elastic collision between a 1000 kg car at standstill ($v_1=0$) and a 1000 kg car traveling at $u_1=15$ km/h (4.17 m/s), the post-collision speed of the forward car is now $v_2=15$ km/h and the previously traveling car is now at a standstill ($u_2=0$). Further assuming a traveling resistance coefficient $\mu_D \approx 0.4$ (including wind resistance, tire-to-road resistance, friction of bearings), the forward car would be propelled about 20 m if no brakes were applied. In order to entirely block the car within 10 cm, a retarding force of $F_B \approx 87 \cdot 10^3$ N would be necessary. This is derived from $F_B=ma$, where m=1000 kg, and the acceleration is expressed in $2ax=v_1^2-v_2^2$, where x is the distance traveled between the initial speed $v_1$ and the end speed $v_2$. This leads to $$F_B = ma = \frac{v_1^2 - v_2^2}{2x}$$

and, assuming m=1000 kg, v1−v2=4.17 m/s, x=0.1 m, $F_B=87 \cdot 10^3$ N. To stop the car within 30 cm, the required braking force is $F_B \approx 29 \cdot 10^3$ N.

Assuming a slightly inelastic collision event with otherwise identical parameters—the coefficient of restitution being approximately e=0.8—the forward car would still be propelled forward at about 12 km/h. The necessary retarding force to stop the forward car within 20 cm would require a retarding force of only about $F_B=27$ kN. The acceleration peak at the instant of the collision can thereby reach a=60 m/s² (with a collision crunch transfer distance of 10 cm) and even more with a crunch zone smaller than 10 cm. Accelerations of this magnitude are quite conducive to whiplash injuries and concussions. When the brake is blocked on impact, the entire or most of the momentum of the impacting car is not converted into momentum of the forward car, but instead into crunch energy. As a result, the bumper shock absorbers absorb the initial impact without propelling the car forward. If the impact force is too great for the bumpers, the excess energy is converted into deformation crunch of the vehicles. By blocking the brakes, the forward car is not suddenly accelerated upon a rear impact of a magnitude which lies below a predetermined threshold.

The routine is ended at step END. It is understood, however, that the processing cycles back to the start while the vehicle is in operation. The operation may be defined when the ignition is active.

While the foregoing examples deal with impact onto a vehicle at standstill, the invention is equally applicable if the forward car is traveling as well. This is taken into account in the method branch 106 and 107. The important feature regarding the impact force in a rear end collision is the relative speed of the two vehicles Δv=u−v.

I claim:

1. A brake system for a motor vehicle with a front end, a rear end, and a plurality of wheels, comprising:
   a sensor disposed in a motor vehicle for sensing a rear impact collision and outputting an electric impact signal indicating whether the rear impact collision is centered at a rear end or if the collision is on a side of the rear end of the vehicle;
   a brake processor connected to said sensor to receive the impact signal from said sensor indicating the rear impact collision and whether the rear impact collision is centered at the rear end or if the collision is on a side;
   said brake processor outputting an electric signal causing a brake actuator to apply a braking force to at least one wheel of the motor vehicle upon determining that a rear impact collision has occurred, and thereby selectively causing the brake actuator to apply the braking force equally on both sides of the motor vehicle or on only one side in dependence on the impact signal.

2. The brake system according to claim 1, wherein said sensor is an acceleration sensor.

3. The brake system according to claim 2, wherein said acceleration sensor has four sensitivity axes for sensing forward acceleration, rearward acceleration, and two mutually opposite lateral accelerations, respectively.

4. The brake system according to claim 2, wherein said acceleration sensor forms part of a passenger protection system of the motor vehicle.

5. The brake system according to claim 1, wherein said sensor is one of a plurality of sensors strategically disposed at a rear end of the motor vehicle.

6. A brake system for a motor vehicle with a front end, a rear end, and a plurality of wheels, comprising:
   a sensor disposed in the motor vehicle for sensing a rear impact collision and outputting an impact signal;
   a brake processor connected to said sensor to receive the impact signal from said sensor indicating a rear impact collision;
   said brake processor applying a braking force to at least one wheel of the motor vehicle upon determining that a rear impact collision has occurred; and
   wherein said processor is programmed to:
   continuously monitor a travel speed of the vehicle and measure a braking force being applied during an operation of the vehicle;

define a class of impacts requiring a brake intervention in dependence on the travel speed and on whether the vehicle brake was applied at an outset of the rear impact collision;

block the brakes with a maximum braking force if the vehicle was at a standstill and the vehicle brake was applied at an outset of the rear impact collision; and if the vehicle was not at a standstill at the outset of the rear impact collision, apply a braking force equivalent to the braking force last measured prior to a rear impact immediately upon an outset of the rear impact collision.

7. A passenger protection method in a motor vehicle, which comprises the steps of:

sensing a sudden impact at a rear end of a motor vehicle and outputting an electric impact signal representing a rear impact collision;

receiving and processing the impact signal to determine whether the rear impact is one of a class of impacts requiring brake intervention and whether the rear impact is centered at the rear end or if the collision is on a side; and if the rear impact belongs to the class of impacts requiring brake intervention, outputting a signal to an actuator and selectively applying a braking force to at least one wheel of the motor vehicle with the actuator in dependence on whether the rear impact is centered at the rear end or if the collision is on a side.

8. The method according to claim 7, which comprises, during an operation of the vehicle, continuously monitoring a travel speed of the vehicle and monitoring whether a vehicle brake is being applied, and defining the class of impacts requiring brake intervention in dependence on the travel speed and on whether the vehicle brake was applied at an outset of the rear impact collision.

9. The method according to claim 7, wherein, if the vehicle was at a standstill and a vehicle brake was applied at an outset of the rear impact collision, the applying step comprises blocking the brakes with a maximum braking force.

10. The method according to claim 7, which comprises continuously monitoring a travel speed of the vehicle and measuring a braking force being applied during an operation of the vehicle, and wherein the applying step comprises applying the braking force last measured prior to a rear impact immediately upon an outset of the rear impact collision.

* * * * *